United States Patent
Blackwood et al.

(10) Patent No.: US 10,392,743 B2
(45) Date of Patent: Aug. 27, 2019

(54) FLEXIBLE HEAT SHIELD WITH SILICONE ELASTOMER AND A TOPCOAT FOR INFLATABLE SAFETY DEVICES

(71) Applicant: Dow Corning Corporation, Midland, MI (US)

(72) Inventors: William Blackwood, Naples, FL (US); Michael Dipino, North Branford, CT (US); Lawrence Rapson, Bay City, MI (US)

(73) Assignee: Dow Silicones Corporation, Midland, MI (US)

( * ) Notice: Subject to any disclaimer, the term of this patent is extended or adjusted under 35 U.S.C. 154(b) by 437 days.

(21) Appl. No.: 14/441,951

(22) PCT Filed: Nov. 12, 2013

(86) PCT No.: PCT/US2013/069552
§ 371 (c)(1),
(2) Date: May 11, 2015

(87) PCT Pub. No.: WO2014/075036
PCT Pub. Date: May 15, 2014

(65) Prior Publication Data
US 2015/0267344 A1    Sep. 24, 2015

Related U.S. Application Data

(60) Provisional application No. 61/772,080, filed on Mar. 4, 2013, provisional application No. 61/725,249, filed on Nov. 12, 2012.

(51) Int. Cl.
*B32B 27/12* (2006.01)
*D06N 3/12* (2006.01)
(Continued)

(52) U.S. Cl.
CPC ............... *D06N 3/128* (2013.01); *B32B 5/02* (2013.01); *B32B 25/20* (2013.01); *B60R 21/217* (2013.01);
(Continued)

(58) Field of Classification Search
CPC ......... D06N 2209/06; D06N 2209/065; D06N 2209/067; D06N 2211/268; D06N 3/0006;
(Continued)

(56) References Cited

U.S. PATENT DOCUMENTS 4,433,069 A    2/1984  Harper
5,574,073 A    11/1996 Juen et al.
(Continued)

FOREIGN PATENT DOCUMENTS

CN    102686645 A    9/2012
CN    102686686 A    9/2012
(Continued)

OTHER PUBLICATIONS

Elasticity:Stress and Strain, https://opentextbc.ca/physicstestbook2/chapter/elasticity-stress-and-strain/. (Year: 2018).*
(Continued)

*Primary Examiner* — Andrew T Piziali
(74) *Attorney, Agent, or Firm* — Warner Norcross + Judd LLP

(57) ABSTRACT

An inflatable vehicle safety device is provided that comprises an inflator, a fluid compartment, and a heat shield. The inflator is capable of providing an inflation fluid used to inflate the fluid compartment. The heat shield, which is located within the fluid compartment, comprises a fabric layer and a thermal barrier layer located adjacent to the fabric layer. The thermal barrier layer includes at least one layer of silicone elastomer and one or more silicone top-
(Continued)

coats. The heat shield has a thermal resistance value of six seconds or more at 725° C. when tested in a hot rod thermal resistivity test.

19 Claims, 5 Drawing Sheets

(51) Int. Cl.
*B32B 5/02* (2006.01)
*B32B 25/20* (2006.01)
*B60R 21/235* (2006.01)
*B60R 21/217* (2011.01)
*B60R 21/231* (2011.01)

(52) U.S. Cl.
CPC ...... *B60R 21/235* (2013.01); *B32B 2307/306* (2013.01); *B32B 2605/00* (2013.01); *B60R 2021/23123* (2013.01); *B60R 2021/23514* (2013.01); *D06N 2209/067* (2013.01); *Y10T 428/24355* (2015.01); *Y10T 428/249921* (2015.04); *Y10T 442/2041* (2015.04); *Y10T 442/3854* (2015.04); *Y10T 442/608* (2015.04); *Y10T 442/674* (2015.04)

(58) Field of Classification Search
CPC ............... D06N 3/0034; D06N 3/128; D06N 2203/066; D06N 2213/03; D06M 2200/30; D06M 2101/34; D06M 15/3568; Y10T 442/2631; Y10T 442/2893; Y10T 442/2041; Y10T 442/2098; Y10T 442/2107; Y10T 442/2115; D10B 2505/124; D10B 2331/02; D03D 1/02; B60R 21/235; B60R 2021/23504; B60R 2021/23509; B60R 2021/23514; B60R 2021/23523; B32B 27/12
USPC ......... 442/64, 65, 66, 71, 72, 168, 181–302, 442/136; 280/728.1–808; 525/431, 446, 525/474–479; 524/266, 268, 269, 588; 428/447; 106/287.13–287.16
See application file for complete search history.

(56) References Cited

U.S. PATENT DOCUMENTS

| | | | |
|---|---|---|---|
| 5,658,674 A | 8/1997 | Lorenzetti et al. | |
| 5,670,556 A | 9/1997 | Loiselle et al. | |
| 5,708,043 A | 1/1998 | Loiselle et al. | |
| 5,733,946 A | 3/1998 | Loiselle et al. | |
| 6,037,279 A | 3/2000 | Brookman et al. | |
| 6,084,002 A | 7/2000 | Nicholson et al. | |
| 6,200,915 B1 | 3/2001 | Adams et al. | |
| 7,153,583 B2* | 12/2006 | Azechi | C08L 83/04 428/447 |
| 8,372,497 B2 | 2/2013 | Blackwood et al. | |
| 2005/0205829 A1 | 9/2005 | Magd et al. | |
| 2006/0217016 A1* | 9/2006 | Lin | B60R 21/235 442/59 |
| 2006/0276585 A1* | 12/2006 | Lork | C08K 5/541 524/588 |
| 2009/0298367 A1 | 12/2009 | Lafaysse et al. | |
| 2010/0178517 A1 | 7/2010 | Pouchelon et al. | |
| 2011/0018244 A1 | 1/2011 | Schindzielorz et al. | |
| 2011/0076479 A1* | 3/2011 | Danielson | C09J 5/02 428/221 |
| 2011/0203664 A1 | 8/2011 | Howell et al. | |
| 2011/0308578 A1 | 12/2011 | Hong et al. | |
| 2012/0055539 A1 | 3/2012 | Kim et al. | |
| 2012/0280479 A1 | 11/2012 | Barth et al. | |
| 2012/0289110 A1 | 11/2012 | Blackwood et al. | |
| 2013/0240036 A1 | 9/2013 | Hatakeyama | |
| 2014/0113516 A1 | 4/2014 | Tanaka et al. | |
| 2015/0171249 A1 | 6/2015 | Howell et al. | |

FOREIGN PATENT DOCUMENTS

| | | |
|---|---|---|
| CN | 102686794 A | 9/2012 |
| EP | 0553840 B1 | 1/1993 |
| EP | 0646672 A1 | 8/1994 |
| JP | H02270654 A | 11/1990 |
| JP | H02270654A A | 11/1990 |
| JP | H04169355 A | 6/1992 |
| JP | 2000313294 A | 11/2000 |
| JP | 2006161212 A | 6/2006 |
| JP | 2009051471 A | 3/2009 |
| JP | 2009531552 A | 9/2009 |
| JP | 2010523831 A | 7/2010 |
| JP | 2010-083946 A | 10/2011 |
| JP | 2012507869 A | 3/2012 |
| WO | WO2007011580 A2 | 1/2007 |
| WO | WO2011082134 A1 | 7/2011 |
| WO | WO2011137121 A1 | 11/2011 |
| WO | WO2012063946 A1 | 5/2012 |
| WO | WO2014008322 A1 | 1/2014 |
| WO | WO2014075036 A1 | 5/2014 |

OTHER PUBLICATIONS

Materials Science, http://www.tpub.com/doematerialsci/materialscience19.htm. (Year: 2018).*
English language abstract and machine translation for JPH02270654 (A) extracted from http://worldwide.espacenet.com database on Oct. 11, 2017, 8 pages.
English language abstract and machine translation for JP2000313294 (A) extracted from http://worldwide.espacenet.com database on Oct. 11, 2017, 17 pages.
English language abstract and machine translation for JP2006161212 (A) extracted from http://worldwide.espacenet.com database on Oct. 11, 2017, 21 pages.
English language abstract and machine translation for JP2009051471 (A) extracted from http://worldwide.espacenet.com database on Oct. 11, 2017, 20 pages.
PCT/US2013/069552 International Search Report dated Jan. 28, 2014, 3 pages.
English language abstract and machine assisted English translation for JP2010-083946 extracted from https://www4.j-platpat.inpit.go.jp/eng/tokujitsu/tkbs_en/TKBS_EN_GM401_Detailed.action database on May 11, 2015, 20 pages.
English language abstract and machine translation for JPH02270654A (A) extracted from http://worldwide.espacenet.com database on Jul. 9, 2018, 7 pages.
English language abstract and machine translation for JP2006161212 (A) extracted from http://worldwide.espacenet.com database on Jul. 9, 2018, 20 pages.
English language abstract and machine translation for JP2009051471 (A) extracted from http://worldwide.espacenet.com database on Jul. 9, 2018, 19 pages.
English language abstract and machine translation for JPH04169355 (A) extracted from http://worldwide.espacenet.com database on Nov. 20, 2018, 6 pages.

* cited by examiner

FLEXIBLE HEAT SHIELD WITH SILICONE ELASTOMER AND A TOPCOAT FOR INFLATABLE SAFETY DEVICES

CROSS-REFERENCE TO RELATED APPLICATIONS

This application is the National Stage of International Patent Application No. PCT/US2013/069552, filed on Nov. 12, 2013, which claims priority to and all advantages of U.S. Patent Application No. 61/725,249, filed on Nov. 12, 2012, and U.S. Patent Application No. 61/772,080, filed on Mar. 4, 2013, the contents of which are hereby incorporated by reference.

This disclosure relates generally to inflatable safety devices. More specifically, this disclosure relates to a flexible heat shield for use in protecting the integrity of fabric used in the construction of the safety device from high temperatures generated upon inflation of the device.

Inflatable safety device systems are used by the automotive industry to protect vehicle occupants in the event of an accident. These inflatable safety device systems typically include a sensor, an inflator, and an airbag or other inflatable component. In the event of an accident, the sensor is set off, thereby activating the inflator to fill the airbag with a gas in order to place a cushion between the occupant and potentially harmful surfaces in the vehicle. All of these operations need to occur within milliseconds after the accident in order to effectively protect the occupant.

The inflator used in these safety devices is generally classified as a cold-gas type, which releases compressed gas, or a pyrotechnic type, which burns a compound, such as sodium azide or alkali metal azide. Pyrotechnic types of inflators are more desirable because the burn rate of the azide compound is controllable and reproducible, thereby, making these devices quite reliable. Pyrotechnic types of inflators also tend to be smaller in overall size, to weigh less, and to be less expensive to manufacture than compressed gas inflators.

The purpose of a heat shield is to protect and maintain the integrity of the airbag during its deployment and prevent burn through by the hot inflator after deployment. A pyrotechnic inflator can reach temperatures of 700° C. to 800° C. in 10 to 20 milliseconds but remains at an elevated temperature of 300° C. to 500° C. for 2 to 3 minutes. As a result of this, the inflator can burn through the bag by melting the uncoated or coated fabric that it comes into contact with.

During the deployment or inflation of the airbag, hot gases leave the inflator and pass through channels formed of fabric joined together to allow the heated gas to deflect off and throughout the airbag. Accordingly, the seams and fabric of the air bag must be protected from the heat of the gas generated by the inflator by the incorporation of a heat shield. The heat shield is typically woven fabric optionally treated at various coat weights of silicone that can be layered as 2 or more layers depending on the desired coat weight.

A variety of fabrics with filament or yarn densities ranging between 470 to 700 decitex or dtex are currently used. The most common fabric is a polyamide, such as nylon 6,6 with a yarn density of about 580 dtex. These fabrics are typically coated with a silicone treatment having a coat weight ranging between 20 grams per square meter (gsm or g/m$^2$) and 150 g/m$^2$. Other known fabric compositions include polyesters and fiberglass although most manufacturers of airbags are moving away from fiberglass in order to avoid the common handling issues associated with this material. The assembly of the heat shield may also include metal liners to prevent the burn through of the hot gases. Other known approaches include using a calendered high consistency rubber sheet between two layers of fabric or in some instances adhered onto the surface of one layer of fabric. These high consistency rubber sheets incorporate greater than 600 g/m$^2$ of silicone and can be quite difficult to handle in that they can be excessively stiff or non-flexible and difficult to sew through and/or package.

While conventional heat shields are useful, they remain less than ideal. More specifically, airbags with a coated inside surface are still susceptible to burn-through because known treatments are only capable of providing limited protection when applied thinly, while a thick rubber sheet defeats the safety system's overall goal of being lightweight and occupying a small volume. Thick sheets are also difficult to sew because of a high coefficient of friction and may cause assembly problems when inserting the inflator into the module. Liners are also problematic because they introduce more bulk and weight to the airbag. Thus conventional heat shields suffer from either being unacceptably bulky and non-flexible or being able to only provide a limited degree of protection.

BRIEF SUMMARY OF THE INVENTION

In overcoming the enumerated drawbacks and other limitations of the related art, the present disclosure provides a thermally resistant layered composite sheet for use as a heat shield in an inflatable safety device, as well as an inflatable safety device incorporating such a layered composite sheet.

The thermally resistant layered composite sheet generally comprises a first fabric layer having a top side and a bottom side; and a thermal barrier layer located adjacent to one of the top side or bottom side in which the thermal barrier layer includes at least one layer of a silicone elastomer and one or more silicone topcoats. Alternatively, the barrier layer is applied directly onto the fabric layer. The composite sheet exhibits a thermal resistance value of six seconds or more at 725° C. in a thermal penetration test; alternatively twelve seconds or more; alternatively 30 seconds or more.

Optionally, the fabric layer may comprise a fabric material and one or more silicone treatments. The silicone treatment may be adjacent to the top side or bottom side of the fabric material either on the same side adjacent to the thermal barrier layer or opposite the side that is adjacent to the thermal barrier layer. Optionally, the thermal barrier layer may include one or more surfaces that are either smooth or textured.

The composite sheet may further comprise a second fabric layer, such that the second fabric layer is located adjacent to the thermal barrier layer on the side that is opposite to the first fabric layer. Optionally, the second fabric material may comprise a fabric material and at least one silicone treatment.

The fabric layer can be a woven fabric, a nonwoven fabric, or a polymeric film or composite selected from polypropylene, polyethylene, fiberglass, polyamides, poly (ethylene) terephthalate, and compositions or mixtures thereof. The woven fabric may have threads with a thickness that is equal to or greater than 20 dtex. When the fabric layer is a nonwoven fabric or a polymeric film it may have a basis weight between about 40 g/m$^2$ and about 400 g/m$^2$.

Alternatively, the silicone elastomer of the barrier layer is a solid sheet or layer; alternatively, the silicone elastomer is a cellular foam or sponge. This silicone elastomer may comprise either a high consistency rubber (HCR) or a liquid silicone rubber (LSR). The silicone elastomer used in the composite sheet exhibits a weight that is between about 100 g/m² to about 600 g/m².

The silicone topcoat of the barrier layer may comprise an organopolysiloxane having one or more silicon atom-bonded alkenyl groups on average in one molecule: an organohydrogenpolysiloxane; a hydrosilylation reaction catalyst present in any amount capable of curing the coating composition; and optionally, a reinforcing filler material, such as silica. The silicone topcoat may be applied such that it exhibits a weight between about 3 g/m² to about 50 g/m². Alternatively, the silicone topcoat is located on the side of the barrier layer that is opposite the fabric layer. When desirable, the thermal barrier layer may include at least two silicone topcoats; the first topcoat being located adjacent the silicone elastomer and the second topcoat separated from the first topcoat and silicone elastomer by a fabric layer. The stiffness exhibited by the silicone topcoat of the barrier layer, as measured by its tensile modulus or Young's modulus of elasticity, is greater than that of the silicone elastomer of the barrier layer or the silicone treatment of the fabric layer.

The optional silicone treatment of the fabric layer may also comprise an organopolysiloxane having one or more silicon atom-bonded alkenyl groups on average in one molecule: an organohydrogenpolysiloxane; a hydrosilylation reaction catalyst present in any amount capable of curing the coating composition; and a reinforcing filler, such as silica. The silicone treatment may be applied such that it exhibits a weight between about 10 g/m² to about 400 g/m².

According to another aspect of the present disclosure, an inflatable vehicle safety device comprises an inflator capable of providing an inflation fluid; a fluid compartment inflatable by the inflator; and one selected from the group of (i) an inflator wrap located adjacent to the inflator in which the inflator wrap comprises at least one layer of silicone elastomer and one or more silicone topcoats; (ii) a heat shield located within the fluid compartment; and (iii) a combination thereof. The inflator wrap or heat shield used in the inflatable vehicle safety device exhibits a thermal resistance value of six seconds or more at 725° C. The heat shield in (ii) comprises a first fabric layer having a top side and a bottom side; and a thermal barrier layer located adjacent to one of the top side or bottom side in which the thermal barrier layer includes at least one layer of silicone elastomer, such as a silicone sheet or a silicone cellular foam or sponge. The silicone elastomer may be either a liquid silicone rubber (LSR) or a high consistency rubber (HCR). Within the vehicle safety device, the fluid compartment may be selected as one from a front air bag, a side air bag, an air curtain, H- or Y-socks, knee bag, and belt bag.

Optionally, the fabric layer may also comprise one or more silicone treatments. The heat shield may include at least one silicone treatment adjacent the top side or bottom side of the fabric layer opposite the side that is adjacent to the thermal barrier layer. The heat shield may also comprise a second fabric layer located adjacent to the thermal barrier on the side that is opposite to the first fabric layer. The second fabric layer may also include an optional silicone treatment when desired. The silicone treatment has a weight between about 10 g/m² to about 300 g/m². The silicone elastomer has a weight between about 100 to about 600 g/m². The silicone topcoat has a weight between about 3 g/m² to about 50 g/m².

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
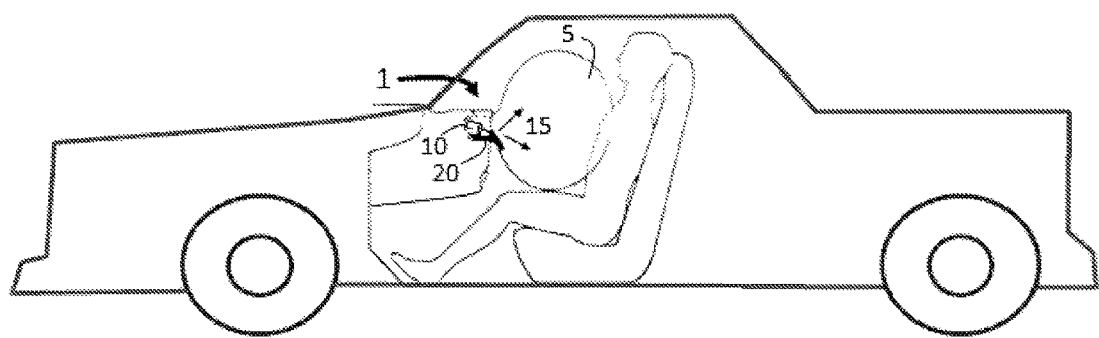
FIG. 1 is a schematic representation of an inflatable safety device used in a vehicle and includes an inflator, a heat shield, and an airbag.

The following description is merely exemplary in nature and is in no way intended to limit the present disclosure or its application or uses. It should be understood that throughout the description, corresponding reference numerals indicate like or corresponding parts and features.

The present disclosure generally relates to a heat shield for use in an inflatable safety device capable of protecting the occupants of a vehicle during an accident. For example, a heat shield made and used according to the teachings contained herein is described throughout the present disclosure in conjunction with an airbag for use in protecting the driver or passenger of an automobile in order to more fully illustrate the concept. The incorporation and use of such a heat shield in conjunction with other types of inflatable safety devices including but not limited to inflatable seat belts, inflatable knee bolsters, inflatable head liners, H-socks, Y-socks, head thorax bags, SAB cushions, and inflatable side curtains, as used in automobiles, as well as in other vehicles, such as motorcycles, boats, trucks, tractors, and off-road vehicles, among others, is contemplated to be within the scope of the disclosure.

Referring to FIG. 1, an inflatable safety device 1 generally includes an air bag 5 and an inflator 10 that is capable of inflating the air bag 5. The inflator 10 contains an ignitable gas generating material, which, when ignited, produces a volume of inflation fluid 15 that inflates the air bag 5. Alternatively, the inflator 10 could contain a stored quantity of pressurized inflation fluid 15, or could contain a combination of pressurized inflation fluid 15 and ignitable material for heating the pressurized inflation fluid. Alternatively, the inflation fluid 15 is a gas.

In operation, when the inflator 10 is activated, the inflation fluid 15 flows out of the inflator 10 through outlets made in the outer side surface of the housing of the inflator 10. The flow of inflation fluid 15 from the inflator 10 is typically transverse to the central axis of the inflator 10. The inflation fluid 15 impinges on the inner surface of the heat shield 20, which diverts the fluid 15 away from the surface of the air bag 5. In other words, the heat shield 20 directs the inflation fluid 15 to flow into the air bag 5.

The presence of a heat shield 20 maintains the integrity of the fabric from which the air bag 5 is made during the operation of the inflatable safety device 1. The purpose of the heat shield 20 is to provide thermal resistance thereby preventing the burn through or melting of the fabric in the airbag 5 caused by the impingement of the hot inflation fluid 15 generated by the inflator 10 or from contact with the hot surface of the inflator 10 during or after the airbag 5 is inflated. The heat shield also allows the manufacturer to remove or eliminate the presence of a variety of metal subcomponents in the air bag 5 that may pose a long-term wear issue and potential threat to the occupant. For example, in a driver's side airbag 5, a sodium azide propellant in the inflator 10 upon activation will decompose at 3000° C. to produce nitrogen gas as the inflation fluid 15. During activation, the inflator 10 can reach temperatures of 700 to 800° C. in 10 to 20 milliseconds and will remain at elevated temperatures of 300° C. to 500° C. for 2 to 3 minutes. As a result of this, the impingement of the hot inflation fluid 15 or the surface of the inflator 10 is capable of burning through the bag or melting the uncoated or coated fabric upon contact.

According to one aspect of the present disclosure, a flexible heat shield 20 is provided for use in an inflatable safety device 1. This heat shield 20 generally comprises a thermally resistant, layered composite sheet that includes a first fabric layer having a top side and a bottom side and a thermal barrier layer. The thermal barrier layer is located adjacent to one of the top side (side A) or bottom side (side B) of the first fabric layer. Alternatively, the thermal barrier layer is applied directly onto the fabric layer. The thermal barrier layer further comprises at least one layer of silicone elastomer and one or more silicone topcoats. The layered composite sheet has a thermal resistance value of six seconds or more at 725° C.; alternatively, greater than 12 seconds at 725° C.; and alternatively, greater than or equal to 30 seconds at 725° C.

When used in a heat shield, the layered composite sheet will have one side that is directly exposed to the hot inflator and heated gases arising from the inflator. The thermal resistance value, which is also known as the "burn-through rate", "burn-through time", or "thermal resistivity", represents the time it takes for a rod at a given temperature to contact the exposed side of the layered composite sheet and burn through the sheet. Each thermal resistance value reported herein is determined using a "Hot Rod" thermal resistivity test. More specifically, a type 304 stainless steel cylindrical rod (the "penetrator") weighing 50 grams and having a diameter and length of 1.27 cm (0.5 inch) and 5.08 cm (2 inches), respectively, is heated to an equilibrated temperature of 725° C. After heating, the hot penetrator is positioned 13.30 cm (5.25 inches) above the exposed surface of a test sample that is held taut in a test stand. The penetrator is then allowed to drop so that the end of the cylindrical rod contacts the exposed surface of the test sample. Sensors start a timer when the rod contacts the fabric and stop the timer when the rod passes through the fabric. The amount of time the heated rod is resting on the surface of the test sample is the measurement of the "thermal resistance" of the test sample. A thermal resistance time of greater than 30 seconds is widely considered the best possible rating since the penetrator will have sufficiently cooled after 30 seconds, thereby making it highly unlikely it will burn through the test sample once a time of 30 seconds is surpassed.

In the layered composite sheet, the silicone elastomer may be a layer of silicone rubber or a cellular foam or sponge. For example, according to one aspect of the present disclosure, the use of liquid silicone rubber (LSR) or high consistency rubber (HCR) may be used as part of the barrier layer located adjacent to the surface of the fabric layer. The fabric layer may be a woven fabric material or a non-woven, solid polymeric composite or film. The composition of the topcoat is a liquid silicone rubber (LSR). When a foam or sponge is used as part of the barrier layer, the foam or sponge cells provide a sacrificial surface that abates the damage done to the fabric layer when the layered composite sheet is used as a heat shield, while the topcoat provides a means to constrain or maintain the integrity of the foam during operation. Although not wanting to be constrained by theory, the use of a foam structured surface is believed to provide thermal protection to the layered composite sheet through surface charring. A more thorough discussion of the use of a silicone foam in the geometry of a heat shield is provided in U.S. Patent Application No. 61/668,702 filed Jul. 6, 2012, the entire contents of which are hereby incorporated by reference.

Figure 2:
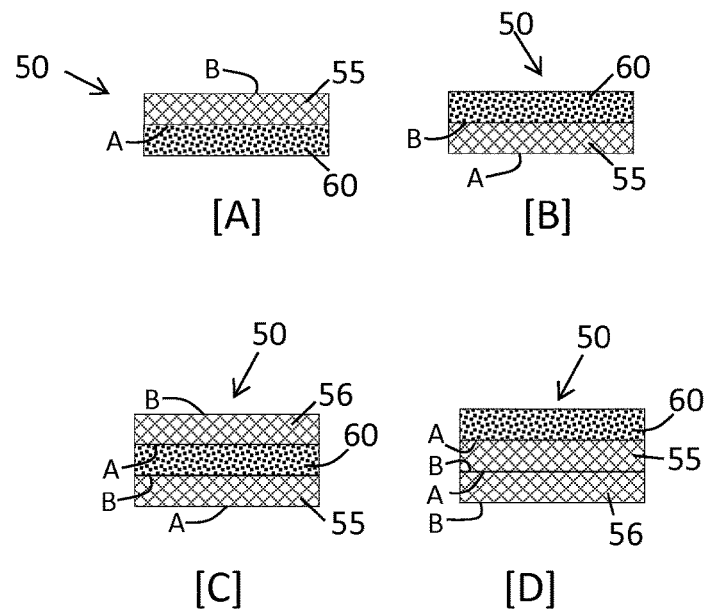
FIGS. 2(A-D) are cross-sectional views of layered composite sheets used in the construction of the heat shield in FIG. 1 according to the teachings of the present disclosure.

Referring now to FIGS. 2(A-D), the layered composite sheet 50 comprises a first fabric layer 55 and a thermal barrier layer 60. The first fabric layer 55 has a top side (A-side) and a bottom side (B-side). The thermal barrier layer 60 may be located adjacent to either the A-side of the fabric layer 55 (FIG. 2A) or the B-side of the fabric layer 55 (FIG. 2B). Alternatively, the thermal barrier layer 60 is applied directly onto the fabric layer 55 (FIGS. 2A & 2B). Optionally, the layered composite sheet 50 may further comprise a second fabric layer 56 also having an A-side and a B-side. In this configuration the barrier layer 60 may be located adjacent to both the first and second fabric layers 55, 56 (FIG. 2C) or the barrier layer 60 may be located adjacent to only one of the first or second fabric layers 55, 56 (FIG. 2D). The composition of each of the first and second fabric layers 55, 56 is independently selected. Alternatively, the first and second fabric layer 55, 56 may have the same composition.

Figure 3:
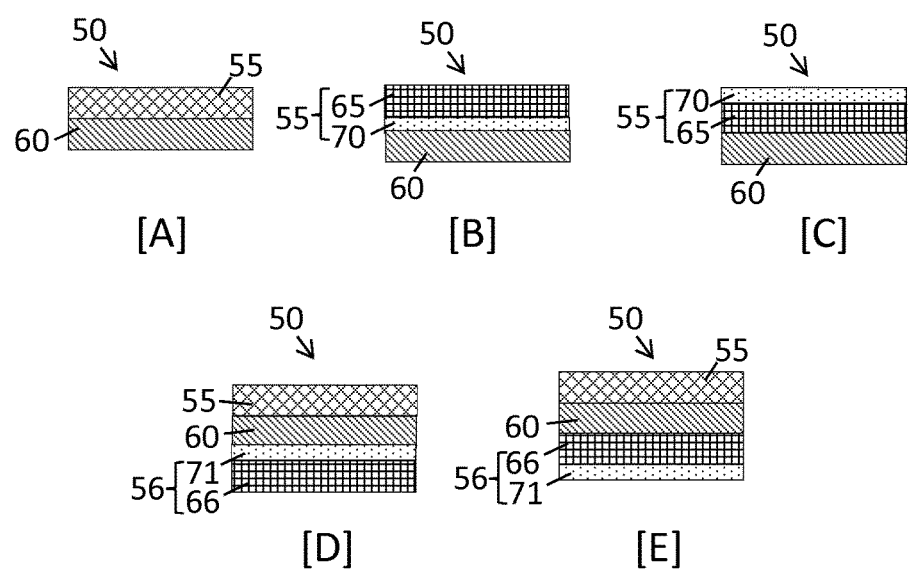
FIGS. 3(A-E) are cross-sectional views of layered composite sheets used in the construction of the heat shield of FIG. 1 demonstrating different configurations for the fabric layer.

Referring now to FIGS. 3(A-E), the first fabric layer 55 (FIGS. 3B-3C) and/or the second fabric layer 56 (FIGS. 3D-3E) may further comprise fabric material 65, 66 and at least one silicone treatment 70, 71. The silicone treatment 70 may be applied to the fabric material 65 such that the treatment 70 is adjacent to the barrier layer 60 (FIG. 3B) or on the side of the fabric layer 55 that is opposite the barrier layer 60 (FIG. 3C). When the layered composite sheet 50 includes a second fabric layer 56, the second fabric layer 56 may be adjacent to the barrier layer 60 (FIG. 3D) or located on the side of the first fabric layer 55 that is opposite the barrier layer 65 (FIG. 3E) as previously described.

According to another aspect of the present disclosure, the second fabric layer 56 may comprise a fabric material 66 and at least one second silicone treatment 71. Still referring to FIGS. 3(A-E), the second silicone treatment 71 may be located adjacent to the barrier layer 60 (FIG. 3D) or on the side of the second fabric material 66 that is opposite to the barrier layer 60 (FIG. 3E).

The first silicone treatment 70 and second silicone treatment 71 are selected independently. Alternatively, the first silicone treatment 70 and second silicone treatment 71 may have the same composition. In each of the configurations shown in FIGS. 3(A-E) the side of the layered composite sheet that will be exposed to the hot temperature of the inflator gases may be either side as found desirable.

Figure 4:
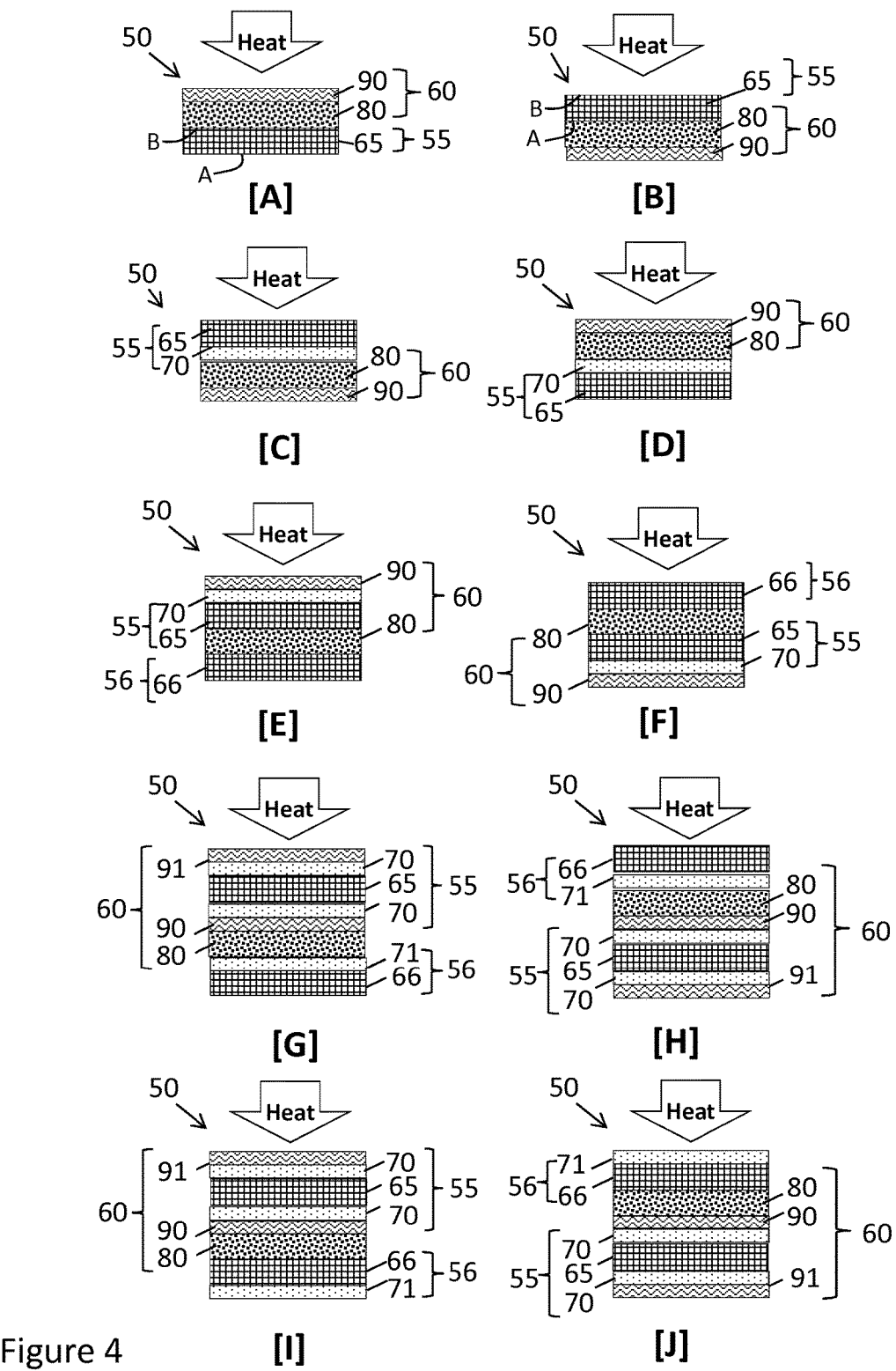
FIGS. 4(A-J) are cross-sectional views of layered composite sheets used in the construction of the heat shield of FIG. 1 demonstrating different configurations for the barrier layer.

Referring now to FIGS. 4(A-J), the barrier layer 60 comprises at least one layer of silicone elastomer 80 and one or more layers of a silicone topcoat 90 (FIG. 4A). The silicone elastomer 80 is applied as part of the barrier layer 60 to the fabric layer 55 having a weight between 100 to 600 g/m². Alternatively, the silicone elastomer 80 is a silicone rubber layer or a silicone cellular foam. The silicone topcoat 90 is applied on to the surface of the silicone elastomer with a weight between about 1 to 100 g/m²; alternatively, about 3 to 50 g/m²; and alternatively, between about 5 to 30 g/m². According to one aspect of the present disclosure, the silicone topcoat becomes the surface that is first subjected to heat during testing and/or operation (FIG. 4A). Alternatively, the silicone topcoat may be the last surface subjected to heat during testing and/or operation (FIG. 4B). When desirable, the silicone topcoat 90 is located on the side of the barrier layer, alternatively, the silicone elastomer, that is opposite the fabric layer 55. The fabric layer 55 may include a fabric material 65 (FIGS. 4A and 4B) or a combination of a fabric material 65 and a silicone treatment 70 (FIGS. 4C and 4D).

Still referring to FIGS. 4(A-J), the composite sheet 50 may further comprise a second fabric layer 56 comprised of either a fabric material 66 (FIGS. 4E-4F) or a combination of a fabric material 66 and a silicone treatment 71 (FIGS. 4G-4H). The composite sheet 50 may further include at least two silicone topcoats 90, 91, the second topcoat 91 being separated from the silicone elastomer 80 and first topcoat 90 of the barrier layer 60 by a fabric layer 55, 56 (FIGS. 4G-4J). The second topcoat 91 may be located such that it becomes the surface that is first subjected to heat during testing and/or operation (FIGS. 4G & 4I) or, alternatively, the last surface subjected to heat during testing and/or operation (FIGS. 4H & 4J). When desirable, the silicone topcoat is located on the side of the barrier layer that is opposite the fabric layer. One skilled in the art will understand that additional combinations of a fabric material, silicone treatment, silicone elastomer and silicone topcoat that are not shown in FIG. 4 may be utilized without exceeding the scope of the present disclosure.

The layered composite sheet 50 of the present disclosure provides multiple benefits over conventional materials when used as a heat shield 20. For example, a layered composite sheet 50 comprising various liquid silicone rubber (LSR) based sheets or foams, high consistency rubber (HCR) based silicone sheets or sponges, or mixtures thereof along with one or more silicone topcoats applied as a barrier layer 60 to various fabric layers 55, 56, such as woven and nonwoven systems of polyamide (e.g., nylon 6,6) and polyester demonstrate substantial thermal resistance when brought into contact with temperatures of 725° C. or higher. Coat weights for the silicone elastomers of about 100 g/m² to about 600 g/m² and silicone topcoats of about 1 g/m² to about 100 g/m² outperform conventional materials at 40-50% less coated fabric weight. Alternatively, silicone elastomers having a coat weight of about 150 g/m² to about 500 g/m² and silicone topcoats having a coat weight of about 3 g/m² to about 50 g/m² may be utilized. The use of the layered composite sheet 50 results in greater flexibility and simplification of the construction or assembly of the airbag 5 near the location of the inflator 15.

The silicone elastomer 80 of the barrier layer 60 may be a solid silicone sheet or layer prepared using liquid silicone rubber (LSR) or high consistency rubber (HCR), including without limitation any base material. The silicone elastomer 80 of the barrier layer 60 may also be silicone cellular foam prepared using liquid silicone rubber (LSR) or silicone cellular sponge prepared using high consistency rubber (HCR), including without limitation any base material. In creating the cellular foam or sponge any blowing agent known to one skilled in the art, including but not limited to, hydrogen gas, nitrogen gas, water vapor, and mixtures thereof can be added to the mixture or generated by a reaction in situ to create a foam or sponge-like structure.

The silicone elastomer may be prepared from a composition comprising polymers defined according to the following general structure:

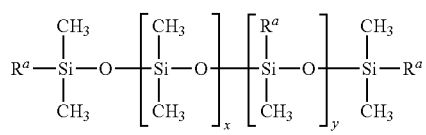

where $R^a$ represents —OH, —CH=CH$_2$, —CH$_3$, or another alkyl or aryl group, and the degree of polymerization (DP) is represented by the sum of subscripts x and y. In liquid silicone rubber (LSR) elastomers, the DP of the polymers used typically ranges from 10 to 1000, resulting in molecular weights ranging from 750 to 75,000; these polymers generally have a viscosity less than 1,000,000 mPa·s at 25° C.; alternatively, less than 750,000 mPa·s at 25° C. For high consistency rubber (HCR) silicone elastomers, the DP is typically in the range of 5,000 to 10,000. Thus, the molecular weight of the polymers or gums used in the manufacture of high consistency rubber elastomers ranges from 350,000 to 750,000 or greater, resulting in viscosities more consistent with a gum or gum-type material. The polymer systems used in the formulation of these elastomers can be either a single polymer species or a blend of polymers containing different functionalities or molecular weights. The remaining ingredients of the composition are selected to conform with the $R^a$ groups so that the composition can be cured into an elastomer. The silicone elastomer used in the composite sheet exhibits a weight that is greater than about 100 g/m² and less than about 600 g/m².

The liquid silicone rubber (LSR) or high consistency rubber (HCR) may be a single component or a two-component formulation. Examples of suitable commercial LSR products for the production of liquid silicone rubber foams include SHS-1000 Silicone Foam, Dow Corning® 3-8277 Foam, Dow Corning® 3-8186 Thixotropic Foam, Dow Corning® 3-8235 Silicone Foam, and Dow Corning® 3-6584 Silicone Foam (Dow Corning Corporation, Midland, Mich.), among others. Examples of suitable commercial LSR products for the production of liquid silicone rubber sheets or layers include Dow Corning® 35-3115, Dow Corning® LCF-3760, Dow Corning® LCF-3600, or Dow Corning® LCF-3730. Examples of suitable HCR products for the production of high consistency silicone rubber sheets or sponges include Dow Corning® SHS-2000 Silicone sheet, or Dow Corning® 4-7060 Silicone Foam, among others.

The silicone elastomer 80 prepared as a one or more-component material may comprise at least one organohydrogensiloxane, at least one polydiorganosiloxane exhibiting unsaturation reacted in the presence of a hydrosilylation catalyst or free radical generator. Suitable polyorganosiloxanes contain at least two alkenyl radicals per molecule and exhibit a viscosity at 25° C. of about 10 to 1,000,000 mPa·s;

alternatively, between about 100 to 250,000 mPa·s at 25° C. The alkenyl radicals include vinyl, allyl and hexenyl groups or mixtures thereof; alternatively the alkenyl radicals are vinyl groups. About 90 percent of the repeating units in the polyorganosiloxane backbone are diorganosiloxane units represented by the general formula $R^1R^2SiO$, where $R^1$ and $R^2$ are independently selected from monovalent unsubstituted and substituted hydrocarbon radicals that typically contain from 1 to about 10 carbon atoms. The alkenyl radicals that characterize the curable polyorganosiloxane are preferably located at the terminal siloxane unit of the molecule; however one or more can be bonded to non-terminal siloxane units. A specific example of the polydiorganosiloxane includes dimethylvinylsiloxy-terminated dimethyl siloxane, tetramethyldivinyldisiloxane.

The organohydrogensiloxane in the silicone elastomer functions as a curing agent, such that the silicon-bonded hydrogen atoms in the organohydrogensiloxane react with the alkenyl radicals of the polyorganosiloxane. The silicon-bonded hydrogen atoms in the organohydrogensiloxane may also be used to generate hydrogen gas for foaming the composition when desirable. Organohydrogensiloxanes that may be used contain an average of at least three silicon-bonded hydrogen atoms per molecule. The other valences on the silicon atoms are occupied with organic groups selected from alkyl having 1 to 6 carbon atoms and phenyl groups. Preferred alkyl groups include methyl, ethyl and hexyl. The most preferred organic groups are methyl groups.

The organohydrogensiloxane can have a linear, cyclic, or branched structure, and can be a homopolymer, a copolymer, mixtures of two or more different homopolymers, mixtures of two or more different copolymers or mixtures of these types of polymers. Polymers that are suitable for use include, but are not limited to, polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units. Alternatively, the organohydrogensiloxanes have a linear structure, exhibit a viscosity of about 1 to about 10,000 mPas at 25° C., and comprise dialkylsiloxane and alkylhydrogensiloxane units with trialkylsiloxy terminal units, where the alkyl radicals contain from 1 to 4 carbon atoms.

The amount of the organohydrogensiloxane used should be sufficient to provide the desired degree of crosslinking during cure, and optionally to produce the required amount of hydrogen gas for foaming the mixture. Generally, the proportion of the organohydrogensiloxane will be within the range of from about 2 to about 80 parts, and alternatively from about 5 to about 40 parts by weight per 100 parts by weight of the polydiorganosiloxane. Additional information regarding the composition of silicone elastomers is provided in U.S. Pat. Nos. 6,084,002, 5,574,073, 4,433,069, 5,670, 556, 5,733,946, and 5,708,043, the entire contents of which are incorporated by reference.

Optionally, the silicone elastomer may include a hydroxyl containing compound selected from the group consisting of polyols, monofunctional alcohols, silanol group-containing organosilanes, silanol group-containing organosiloxanes, and water or mixtures thereof. The hydroxyl groups in the compound react with some of the silicon-bonded hydrogen of organohydrogensiloxane to produce hydrogen, which optionally can be used to create the cells in a foam. These hydroxyl containing compounds may be referred to by one skilled in the art of foams as a blowing agent. When the hydroxyl containing compound comprises a polyol, it is an organic alcohol having from about 3 to about 12 carbon atoms and containing an average of at least two hydroxyl groups per molecule. The carbon chain which makes up the backbone of the polyol may be straight-chained or branched, or may have an aromatic ring to which a hydroxyl group is not directly bonded. Several specific examples of such polyols include aliphatic polyhydric alcohols, e.g., diols, such as 1,2-ethanediol, 2,3-propanediol, 1,3-propanediol, 1,4-butanediol, 1,5 pentanediol, and 1,6 hexane diol; 1,2,3-propanetriol; 2,2-bis-hydroxymethyl-1butanol; tetritols, such as erythritol and pentaerythritol (2,2-bis-hydroxymethyl-1,3-propane diol); pentitols, such as arabitol, xylitol, and methylpentitol; hexitols, such as mannitol and sorbitol; and cycloaliphatic polyhydric alcohols, such as cyclohexanediols, cyclohexane tirols, and inositol. Sufficient polyol should be used to obtain the necessary amount of hydrogen for the foaming process and/or the desired degree of release in the post cured materials. Generally about 0.05 to 8 parts by weight of the hydroxyl containing compound should be used per 100 parts of the combined weight of the polydiorganosiloxane and organohydrogensiloxane. Alternatively, the amount of the hydroxyl containing compound is is 0.2 to 5 parts by weight per 100 parts of the combined weight of the polydiorganosiloxane and organohydrogensiloxane Optionally, the silicone elastomer may further comprise heat resistant fibrous or cellular materials as finely divided reinforcing fillers and non-reinforcing mineral fillers. Such heat resistant and fibrous or cellular materials may include, but not be limited to, various amorphous or crystalline inorganic compounds, such as fumed silica, precipitated silica, quartz and calcium carbonate; and metal oxides such as alumina, hydrated alumina, ferric oxide and titanium dioxide; or mixtures thereof. The amount of the fibrous or cellular materials added to the silicone elastomer may range from about 5 wt. % to about 50 wt. % with respect to the overall weight of the silicone elastomer; alternatively, from about 15 wt. % to 35 wt. %; alternatively, from about 30 wt. % to 35 wt. %. Such fillers may be treated to render them hydrophobic. A compound used to treat the fillers may be silane, such as an alkoxysilane, an alkoxy-functional oligosiloxane, a cyclic polyorganosiloxane, a hydroxyl-functional oligosiloxane, such as a dimethyl siloxane or methyl phenyl siloxane, a stearate, or a fatty acid.

The silicone elastomer may also include other additives and pigments for thickening, as well as other purposes. Examples of such additives include siloxane resins, hydrogenated castor oil, and pigments, such as carbon black, zinc oxide, dyes, and hexamethyldisiloxane, as well as a variety of anti-oxidants, heat stabilizers, thixotropic agents, foam stabilizers, ultraviolet light stabilizers, flame retarding agents, and catalyst inhibitors such as cyclic methylvinylsiloxanes to increase working time. The silicone elastomer may also include a solvent, such as xylene to assist in the dispersion of the various components.

The curative molecule or process may be any molecule or process known to one skilled in the art, including but not limited to the use of hydrosilylation catalysts or free radical generators, such as organic peroxides or ultraviolet radiation. The organic peroxide selected for use may include any peroxide known to one skilled in the art to be useful in silicone rubber processing. Several examples of organic peroxides include any peroxide that belongs without limitation to the peroxide family of diperoxyketals, peroxydicarbonates, peroxyesters, diacyl peroxides, benzoyl peroxide, ketone peroxides, dialkyl peroxides, or hydroperoxides.

The hydrosilylation catalyst may comprise a platinum group metal catalyst including any rhodium, ruthenium, palladium, osmium, iridium or platinum-containing catalysts known to one skilled in the art to facilitate hydrosilylation reactions. Alternatively, the platinum group catalyst is a platinum catalyst. Such catalysts are also efficient in promoting the reaction between SiH groups and C—OH groups in organic alcohols to provide hydrogen for the foaming process. Suitable forms of platinum catalysts include but are not limited to chloroplatinic acid, 1,3-diethenyl-1,1,2,2-tetramethyldisiloxane platinum complex, complexes of platinous halides or chloroplatinic acid with divinyldisiloxane and complexes formed by the reaction of chloroplatinic acid, divinyltetrahmethyldisiloxane and tetramethyldisiloxane.

The amount of platinum catalyst is generally the amount that provides from 5 to 250 parts by weight of platinum metal per million parts of the combined weights of the polydiorganosiloxane and organohydrogensiloxane. An amount of platinum less than 5 parts per million by weight is insufficient for a rubber to form, while an amount greater than 200 parts per million by weight is not economical. The silicone elastomer may be either low-density or high-density in nature; alternatively, the silicone elastomer is low-density. The silicone elastomer is cured at a temperature less than about 240° C., alternatively at a temperature ranging from about 25° C. to about 100° C. with or without added relative humidity. The conditions under which the silicone elastomer layer is allowed to cure can impact the resulting material density. The silicone elastomer structure in the layered composite sheet can exhibit a smooth surface or an uneven or textured surface 80.

The silicone topcoat 90, 91 may be a coating of a silicon-based composition comprising: an organopolysiloxane polymer having a siloxane backbone being end-blocked with at least two silicon bonded groups R, wherein R denotes an olefinically unsaturated hydrocarbon substituent, an alkoxy group, or a hydroxyl group; a cross-linking organosilicon material having at least 3 silicon-bonded reactive groups X; any catalyst known to one skilled in the art to be capable of promoting the reaction between the silicon-bonded groups R and the silicon-bonded reactive groups X; and one or more filler materials, including but not limited to reinforcing fillers and fillers having a substantially laminar form. The silicone-based composition is capable of forming an elastomeric silicone topcoat upon curing.

Organopolysiloxane polymers suitable for use in forming the silicone topcoats 90, 91 include elastomer-forming silicone based compositions have units of the general formula $R^1_a R^2_b SiO_{4-a-b/2}$, wherein $R^1$ is a monovalent hydrocarbon group having up to 18 carbon atoms, $R^2$ is a monovalent hydrocarbon or hydrocarbonoxy group or a hydroxyl group, a and b have a value of from 0 to 3, and the sum of a+b being no more than 3. Alternatively, $R^1$ denotes an alkyl or aryl group, such as a methyl, ethyl, propyl, isobutyl, hexyl, phenyl, or octyl group. Alternatively, $R^2$ denotes either a hydroxyl group or an alkoxy group suitable for condensation reactions or an alkenyl or alkynyl group suitable for addition reactions. The organopolysiloxane polymers may be either branched or linear in structure having at least one alkenyl group per molecule. Alternatively the organopolysiloxane polymers have at least two silicon-bonded alkenyl groups per molecule.

The organopolysiloxane may also be a polydiorganosiloxane having the general formula:

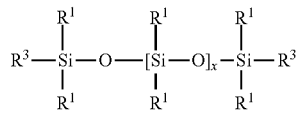

where $R^1$ is as defined above, $R^3$ denotes an alkenyl group having up to 8 carbon atoms, with the formula —$R^4_{y'}$—CH=CH$_2$, where $R^4$ denotes a divalent hydrocarbon group having up to 6 carbon atoms, preferably an alkylene group having up to 4 carbon atoms, y has a value of 0 or 1, and x has a value of from 10 to 1500, alternatively 50 to 1200, alternatively 70 to 800. One example of such a polydiorganosiloxane is an α,ω-vinyldimethylsiloxy polydimethylsiloxane polymer having a viscosity of from 50 to 250,000 mPa·s at 25° C.; alternatively, 100 to 100,000 mPa·s, alternatively 250 to 60,000 mPa·s.

The cross-linking organosilicon material may be any organosilicon compound, which is capable of reacting with the organopolysiloxanes described above. Suitable organosilicon compounds may be monomers, homopolymers, copolymers, or mixtures thereof which comprise at least one unit of the general formula, $R^1_a R^5_b SiO_{4-a-b/2}$, wherein $R^1$, as well as a and b are as defined above, and $R^5$ is a hydrogen atom, a hydroxyl or an alkoxy group. The cross-linking organosilicon materials are preferably selected from silanes, low molecular weight organosilicon resins and short chain organosiloxane polymers. Several examples of suitable silanes that may serve as cross-linking organosilicon compounds include, but are not limited to, alkyltrialkoxy silanes, such as. methyltrimethoxysilane, ethyltrimethoxysilane, methyltriethoxysilane, and methyltrihydrosilane. A more thorough discussion of various silicone topcoat compositions that are suitable for use in the barrier layer of the present disclosure is provided in U.S. Pat. No. 6,200,915, Japanese Patent Publication No. JP2010-083946, and U.S. Patent Publication No. 2006/276585, the entire contents of which are incorporated herein by reference.

The silicone topcoat exhibits a stiffness, as measured by its tensile or Young's modulus that is greater than the stiffness exhibited by either the silicone elastomer of the barrier layer or the silicone treatment of the fabric layer. Alternatively, the hardness exhibited by the silicone topcoat is greater than the hardness exhibited by the silicone elastomer or the silicone treatment. The Young's modulus of the silicone topcoat is at least 10% greater; alternatively, 20% greater; alternatively 25% greater than the modulus of the silicone elastomer or the silicone treatment. Alternatively, the Young's modulus of the silicone topcoat is greater than about 2 MPa; alternatively, greater than about 5 MPa. Alternatively, the hardness of the silicone topcoat is greater than about about 35 durometer (Shore A); alternatively, greater than about 40 durometer (Shore A).

Optionally, a silicone treatment 70, 71 may also comprise part of the fabric layers 55, 56. This silicone treatment 70, 71 may be any conventional silicone film or treatment known to one skilled in the art. The silicone treatment 70, 71 may comprise an organopolysiloxane having aliphatically unsaturated hydrocarbon or hydrocarbonoxy substituents, an organosilicon cross-linker having at least 3 silicon-bonded hydrogen atoms, a catalyst able to promote the reaction of the aliphatically unsaturated hydrocarbon or hydrocarbonoxy substituents with Si—H groups and a silica reinforcing filler. The silica filler may include 2% to 60% by weight based on the silica filler of an oligomeric organopolysiloxane containing Si-bonded methyl and vinyl groups and silanol end groups. The silicone treatment exhibits a Young's modulus less than about 5 MPa; alternatively, less than about 2 MPa and a hardness less than about 40 durometer (Shore A); alternatively, less than about 35 durometer (Shore A).

The silicone treatment 70, 71 may be a liquid silicone rubber (LSR) film, which includes a mixture of four components (A), (B), (C) and (D), such that (A) is an organopolysiloxane having two or more silicon atom-bonded alkenyl groups on average in one molecule: 100 parts by weight of the organopolysiloxane; (B) is an organohydrogenpolysiloxane; (C) is a hydrosilylation reaction catalyst present in any amount capable of curing the coating composition, and (D) is a reinforcing silica fine powder present 0.1 to 50 parts by weight of the coating composition. Component (B) is further described as being either (b-1) an organohydrogenpolysiloxane having at least three silicon atom-bonded hydrogen atoms in one molecule with at least one of the hydrogen atoms being present as a siloxane unit represented by the formula of R $HSiO_{2/2}$ (wherein R represents a non-substituted or substituted monovalent hydrocarbon group containing no aliphatic unsaturated bond) in the molecule, (b-2) a linear organohydrogenpolysiloxane having one silicon atom-bonded hydrogen atom only at each of both terminals of the molecular chain and having no aliphatic unsaturated bond(s) in the molecule, or a mixture of (b-1) and (b-2), The organohydrogenpolysiloxanes in (b-1) and (b-2) may be blended such that the molar ratio of silicon atom-bonded hydrogen atoms contained in (b-1) and (b-2): alkenyl groups contained in component (A) ranges from about 0.8:1.0 to about 2.5:1.0, and the total number of silicon atom-bonded hydrogen atoms contained in organohydrogenpolysiloxane (b-2) is 70 to 100% of the total number of silicon atom-bonded hydrogen atoms contained within component (B). When the silicon atom-bonded hydrogen atoms contained in organohydrogenpolysiloxane (b-2) is 100%, component (B) consists only of organohydrogenpolysiloxane (b-2).

The silicone treatment 70, 71 may be applied to the fabric layers 55, 56 at a weight between 10 $g/m^2$ and 400 $g/m^2$; alternatively, 25 $g/m^2$ to 200 $g/m^2$. A further description of the silicone treatment 70, 71 that may comprise part of the first and/or second fabric layer 55, 56 is provided in International Patent Publication No.'s WO 2011/137121 and WO 2011/82134, the entire contents of which are hereby incorporated by reference.

The first and second fabric layers 55, 56 may include any polymeric film or composite, as well as any woven or nonwoven fabric materials 65, 66 having filament or yarn density that is equal to or greater than 20 decitex or dtex, alternatively, ranging between about 200 to about 900 dtex, alternatively, between about 470 dtex to about 700 dtex; alternatively about 580 dtex. One example of a fabric material 65, 66 is a polyamide with a yarn density of about 580 dtex woven in the warp and weft directions. Another example of a woven fabric material 65, 66 includes polyamide fibers woven in one direction, such as the warp direction, and polyester fibers woven in another direction, such as the weft direction. The fabric material 65, 66 of the fabric layer 55, 56 may have a composition comprised of polypropylene, polyethylene, polyamides, fiberglass, poly (ethylene) terephthalate, and compositions or mixtures thereof. Specific examples of polyamides that may be used as the fabric material include nylon 6,6 and other examples such as the para-aramid Kevlar® and the meta-aramid Nomex®.

When the fabric layer 55, 56 is a woven fabric material 65, 66, the weave density of the fabric material may be any range preselected based upon the application criteria; alternatively the weave density may range from about 41×41 to about 53×53. When the fabric layer 55, 56 is a nonwoven fabric material or composite 65, 66, the thickness of the film may be determined as a function of weight per unit area. A nonwoven fabric material or a polymeric composite when used as the fabric layer 55, 56 will have a weight that ranges between about 40 $g/m^2$ and about 400 $g/m^2$, alternatively between about 70 $g/m^2$ and 135 $g/m^2$. The fabric layer 55, 56 may further include any additives or be exposed to any surface treatments known to one skilled in the art, including but not limited to surface fluorination.

The silicone elastomer 80 of the barrier layer 60 may be applied to the fabric layer 55, 56 through the use of a nip roller, a knife blade, or any other process known to one skilled in the art in order to control the coating weight to any desired or targeted amount and to apply a release liner. For example, a liquid silicone rubber (LSR) foam may be coated onto the surface of the fabric layer 55 or between two fabric layers 55, 56 and then passed through rollers with the initial gap set to accommodate the desired thickness of the cellular foam layer. A release liner (not shown) then may optionally be applied.

The silicone topcoat 90, 91 may be applied onto the silicone elastomer 80 or the fabric layer 55, 56 using knife coating, dip coating, flow coating, or any other conventional technique known to one skilled in the art. Similarly, a silicone treatment 70, 71 may also be applied onto the fabric layer 55, 56 using knife coating, dip coating, flow coating, or any other conventional technique known to one skilled in the art. The resulting layered composite sheet 50 may be supplied as a finished product in the form of a converter roll or as individual pieces. Individual pieces may be cut from a roll using lasers or the like.

According to another aspect of the present disclosure, a vehicle safety device is provided that comprises an inflator capable of generating an inflation fluid; a fluid compartment that can be inflated by the inflator; and a heat shield located within the fluid compartment. The fluid compartment is selected as one from a front air bag, a side air bag, an air curtain, H or Y socks, a knee bag, and a belt bag, among others. Alternatively, the fluid compartment is selected as a front air bag or a side air bag.

The heat shield in the vehicle safety device comprises one or more of the layered composite sheets including a fabric layer and a barrier layer as previously described herein. The barrier layer used in the layered composite sheets comprises at least one layer of silicone elastomer and one or more silicone topcoats. Alternatively, the fabric layer may comprise a fabric material and one or more silicone treatments applied to the surface of the fabric material. The silicone elastomer may be silicone sheet or a cellular foam or sponge. The heat shield may also include, at least one silicone treatment adjacent the side of the fabric layer that is opposite the side adjacent to the barrier layer. When desired, the layered composite sheets used in the heat shield may also include a second fabric layer. This second fabric layer may be located adjacent to the thermal barrier on the side that is opposite to the first fabric layer. At least one silicone treatment may optionally be applied to the fabric material of the second fabric layer. Optionally, the heat shield may include additional protective features or materials, such as the incorporation of a metal plate or thermal liner. The heat shield may also be attached or located adjacent to the surface of the inflator. In fact, the heat shield can be constructed such that it encompasses or surrounds the inflator.

According to yet another aspect of the present disclosure, the inflator may be encompassed or surrounded by an inflator wrap that is comprised of a silicone elastomer layer and a silicone topcoat. The inflator wrap may be attached to or located adjacent to the inflator. The general purpose of the inflator wrap is to provide thermal resistance against direct contact between the hot inflator and the fabric or internal surface of the inflatable safety device. The silicone elastomer layer associated with the inflator wrap may be similar to or the same in composition as that previously described with respect to the thermal barrier layer used in the heat shield. Alternatively, the silicone elastomer layer used as the inflator wrap is a silicone rubber sheet or a silicone rubber foam or sponge and the silicone topcoat is a liquid silicone rubber coating. Such an inflator wrap may also be used in combination with a heat shield to further enhance the thermal resistance of the inflatable safety device.

Several examples of thermal barrier layers are prepared and compared according the teachings of the present disclosure using the following method. In Run No.'s 1-6, different amounts of liquid silicone rubber (LSR) is applied as a solid layer to a fabric layer by mixing together Part A and Part B of a two-part LSR (SHS-1000 Silicone Foam, Dow Corning Corporation) to form a foamable LSR mixture. This LSR mixture is poured onto a sheet of Mylar™ plastic or the fabric layer, a second sheet of Mylar or a second fabric layer is then placed over the mixture. The LSR mixture is then hand-drawn between two parallel rollers or cylinders in a coating apparatus with the gap between the rollers set at the desired thickness, e.g., at 0.0457 cm-0.140 cm (0.018" to 0.055") plus the thickness of the 2 sheets of Mylar® and fabric layer. Once the LSR mixture is drawn down it is cured for several minutes, e.g., 3-5 minutes, at less than about 100° C., alternatively between about 50° C. and 100° C. Upon removal of the Mylar® from the cured LSR layer, a portion of the silicone elastomer and fabric combination is stored for testing as composite sheets, while a topcoat is applied to a second portion of the collected silicone elastomer and fabric combination through the use of a flow coating system. The topcoat is subsequently cured and the portion of the material comprising a fabric layer, silicone elastomer, and a topcoat is also stored for testing as composite sheets.

Figure 5:
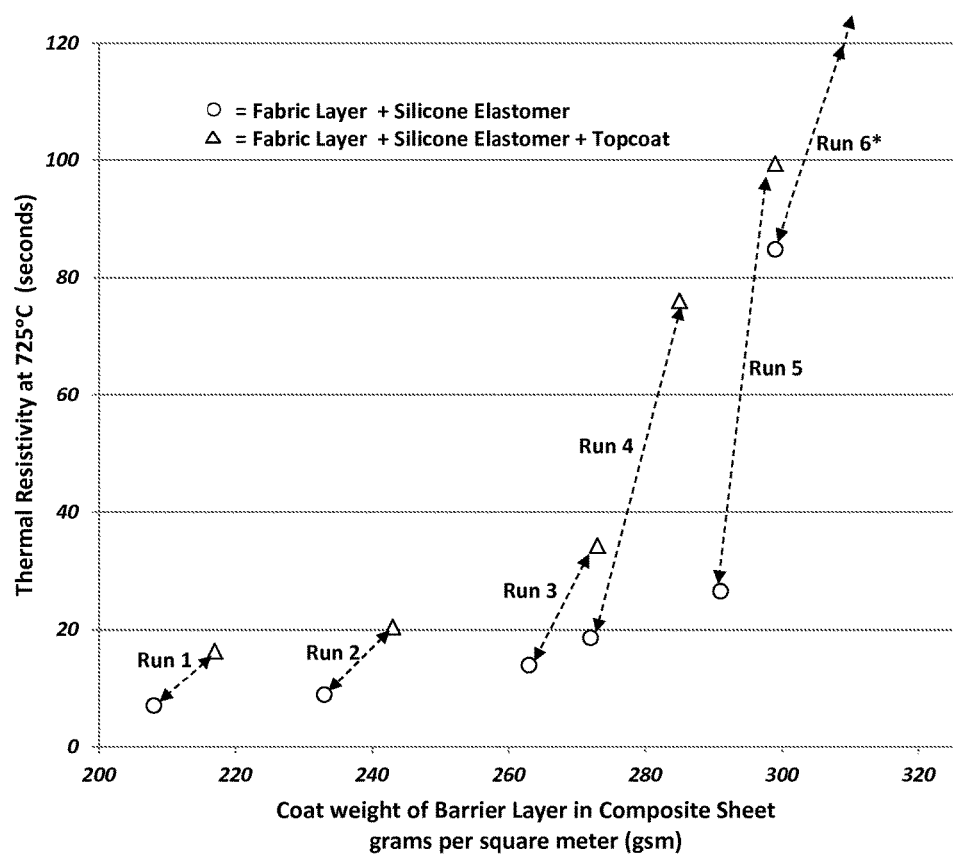
FIG. 5 is a graphical representation of the thermal resistivity of a layered composite sheet plotted as a function of barrier layer weight per square meter of surface area.

In Run No.'s 1-6, a 700 dtex nylon 6,6 fabric material including a silicone treatment (LCF 35-3115, Dow Corning Corporation, Midland, Mich.) is used as the fabric layer and a liquid silicone rubber (LCF 3715, Dow Corning Corporation, Michigan) is applied to the silicone elastomer as the silicone topcoat. Referring now to FIG. 5, the amount of silicone elastomer applied to the fabric layer ranges from about 205 g/m$^2$ in Run No. 1 to about 295 g/m$^2$ in Run No. 6 (see data points labeled as O). The thermal resistivity of the silicone elastomer/fabric layer composite sheets is observed to range from about 5 seconds in Run No. 1 to about 85 seconds in Run No. 6 when tested in a Hot Rod Test using a penetrator at a temperature of 725° C. The thermal resistivity of these composite sheets increases as the amount of silicone elastomer applied to the fabric layer increases as demonstrated by comparing the thermal resistivity measured in Run No.'s 1-6 (see data points labeled as O).

In comparison, the addition of a silicone topcoat to the silicone elastomer layer significantly enhances the thermal resistivity of the composite sheets. Still referring to FIG. 5, the amount of silicone topcoat applied to the silicone elastomer ranges between 8-10 g/m$^2$ in Run No.'s 1-3 and 5-6, while 13 g/m$^2$ is added in Run No. 4 (see data points labeled as Δ). In FIG. 5, the data points (Δ) are plotted as a function of the overall coat weight of the barrier layer, which includes both the amount of silicone elastomer and the silicone topcoat. The overall coat weight of the barrier layer ranges from about 215 g/m$^2$ in Run No. 1 to about 305 g/m$^2$ in Run No. 6. The thermal resistivity of the topcoat/silicone elastomer/fabric layer composite sheets is observed to range from about 15 seconds in Run No. 1 to greater than 120 seconds in Run No. 6 when tested in a Hot Rod Test using a penetrator at a temperature of 725° C. The test is normally stopped at 120 seconds because once this length of time has been reached the rod used in the test is no longer hot enough to further penetrate the test sample. The thermal resistivity of the composite sheets increases as the overall amount of the barrier layer (cellular foam & topcoat combination) applied to the fabric layer increases as demonstrated by comparing the thermal resistivity measured in Run No.'s 1-6 (see data points labeled as Δ).

Still referring to FIG. 5, a comparison between the thermal resistivity exhibited by the composite sheets comprising the fabric layer and silicone elastomer (see data points labeled as O) and the composite sheets comprising the fabric layer, silicone elastomer, and silicone topcoat (see data points labeled as Δ) in each run demonstrates a substantial improvement or enhancement in thermal resistivity. In Run No.'s 1-6 greater than a 100% increase in thermal resistivity is demonstrated upon the addition of a silicone topcoat to the silicone elastomer/fabric layer composite sheet. Alternatively, in Run No.'s 3-6 greater than a 200% increase in thermal resistivity is observed. The addition of a topcoat at about 9 g/m2 to the silicone elastomer to create the barrier layer increases the thermal resistivity of the composite sheet to a level that is similar to increasing the amount of the silicone elastomer by about 50 g/m2 (e.g., compare Δ point in Run No. 1 with O point in Run No. 3).

Figure 6:
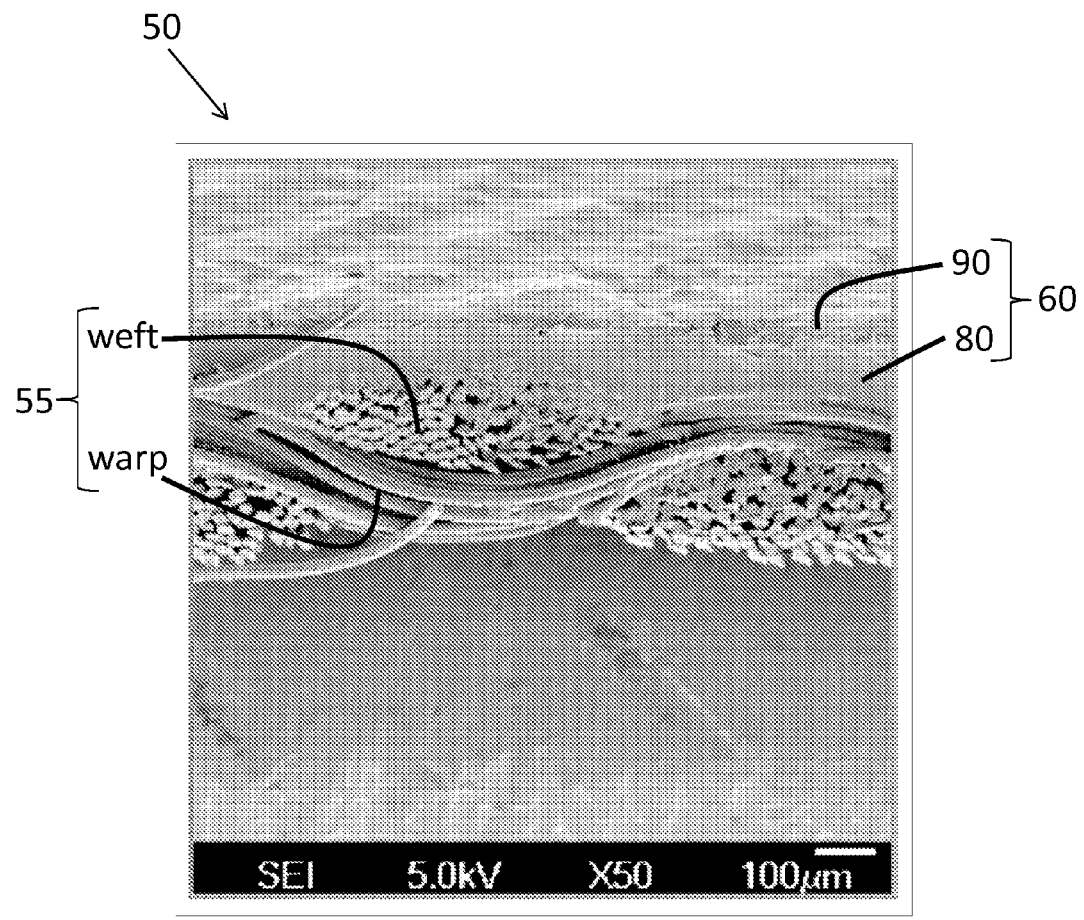
FIG. 6 is a cross-sectional view of a layered composite sheet at 50× magnification obtained using a scanning electron microscope (SEM).

Referring now to FIG. 6, a scanning electron microscopic (SEM) image showing the cross-section of one possible configuration for a composite sheet 50 prepared according to the teachings of the present disclosure is provided. More specifically, the composite sheet 50 is comprised of a woven fabric layer 55 having fibers oriented in both the warp and weft directions. A silicone elastomer 80 is located adjacent to the fabric layer 55 as part of the barrier layer 60. A silicone topcoat 90 is applied to the surface of the silicone elastomer 80 to complete the formation of the barrier layer 60.

The following specific examples are given to further illustrate the preparation and testing of a heat shield in an inflatable safety device according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

Example 1—Thermal Resistance of a Composite Sheet with Thermal Barrier Layer

A composite sheet is prepared and tested using the hot rod test in accordance with the Configurations, A and B, as shown in FIGS. 4A and 4B, respectively. The composite sheet in this example comprises a fabric layer that includes a 700 dtex nylon 6,6 open weave fabric material. The fabric layer does not include any silicone treatment applied to the fabric material. A two-part liquid silicone rubber (LSR) layer (Silastic® 591, Dow Corning Corporation, Midland, Mich.) is applied to the surface of the fabric layer and cured. A two-part liquid silicone rubber topcoat is then applied to the surface of the silicone elastomer and cured to form the barrier layer. The overall amount of silicone elastomer and topcoat used as the barrier layer on the fabric layer is 297 g/m². The composite sheet is tested in both Configuration A and Configuration B. In Configuration A, the surface that makes initial contact with the hot rod during the performance of the test is the silicone topcoat (see FIG. 4A). In Configuration B, the surface that makes initial contact with the hot rod during the performance of the test is the fabric layer (see FIG. 4B). In Configuration B, the silicone topcoat is the last component that makes contact with the hot rod during the performance of the test. The thermal resistivity of the composite sheet in this example is measured to be 27.1 seconds for Configuration A and 5.1 seconds for Configuration B. Thus a 5-fold increase in thermal resistivity is observed when the composite sheet is used according to Configuration A as opposed to Configuration B.

Example 2—Thermal Resistance of Another Composite Sheet with Thermal Barrier Layer A composite sheet is prepared and tested using the hot rod test in accordance with the Configuration C and Configuration D, as described in FIGS. 4C and 4D, respectively. The composite sheet in this example comprises a fabric layer that includes a 470 dtex nylon 6,6 fabric material and a silicone treatment in the amount of 30 g/m². High consistency rubber (HCR) (52 durometer, 430% elongation, SO33C, Dow Corning Corporation, Midland, Mich.) is applied to the surface of the fabric layer and cured. A two-part liquid silicone rubber topcoat is then applied to the surface of the HCR elastomer layer and cured to form the barrier layer. The overall amount of HCR and topcoat used as the barrier layer applied to the fabric layer is 585 g/m². The composite sheet is tested in both Configuration C and Configuration D. In Configuration C, the surface that makes initial contact with the hot rod during the performance of the test is the silicone topcoat (see FIG. 4C). In Configuration D, the surface that makes initial contact with the hot rod during the performance of the test is the fabric layer (see FIG. 4D). In Configuration D, the silicone topcoat is the last component that makes contact with the hot rod during the performance of the test. The thermal resistivity of the composite sheet in this example is measured to be greater than 120 seconds for both Configurations C and D.

One skilled in the art will understand that the properties measured for the layered composite sheets and heat shield products made there from represent properties that are routinely measured and can be obtained by multiple different methods. For example, viscosity measurements are conducted using a Brookfield viscometer, spindle 3 at 10 rpm for the silicone topcoat and spindle 7 at 10 rpm for the silicone elastomer. The weight of the silicone elastomer is measured by subtracting the weight of the fabric layer from the weight of the fabric layer coated with the silicone elastomer; alternatively, the weight of the silicone topcoat is obtained by subtracting the weight of the fabric layer and silicone elastomer from the total weight of the layered composite sheet. Hardness is measured using the Shore A scale according to ASTM 2240 test protocol; alternatively, using ISO 7619, ISO 868, DIN 53505, or JIS K 6253 test protocols. The Young's modulus is measured according to ASTM E111 or through the use of an instrument, such as a tensometer, to perform a convention tensile test. The methods described herein represent one such method and other methods may be utilized without exceeding the scope of the present disclosure.

One skilled in the art will further understand the benefits associated with using a composite sheet of the present disclosure. More specifically, existing art that utilized fiberglass fabric is difficult to cut, introduces fiberglass particles when being cut, shortens needle life during sewing operations, is stiffer than foam, and is not accepted in all workplace environments. The use of a composite sheet prepared according to the present disclosure provides a composite sheet that is lighter in overall weight, easier to pack and when used in the sandwich configuration yields lower number of fabric layers than conventional solutions. In addition, the use of silicone elastomer as a heat sink in the airbag or other inflatable safety device can eliminate the use of metal reinforcements in the airbag to prevent the post melt through of the inflator through the bag. The use of a silicone topcoat reduces the overall weight of the composite sheet because the thermal resistivity offered by a composite sheet having a barrier layer using silicone elastomer combined with 3-50 g/m² of a topcoat is substantially greater than a composite sheet having a barrier layer of a comparable weight comprised only of silicone elastomer. In addition, the thermal barrier layer of the present disclosure is capable of reducing the coefficient of friction (CoF) of the composite sheet from greater than about 1.0 CoF units; alternatively, greater than 2.0 CoF to less than about 0.5 CoF units.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A thermally resistant layered composite sheet for an inflatable vehicle safety device, the composite sheet comprising:
   a first fabric layer having a top side and a bottom side; and
   a thermal barrier layer comprising;
      at least one silicone elastomer layer, and
      one or more silicone topcoats different from the silicone elastomer layer;
      the thermal barrier layer being located adjacent to one of the sides such that the silicone topcoat is spaced from the first fabric layer and the silicone elastomer layer is sandwiched between the first fabric layer and the silicone topcoat;
   wherein the silicone elastomer layer is formed from a liquid silicone rubber (LSR) composition and exhibits a weight that is between about 100 g/m² to about 600 g/m²;
   wherein the silicone topcoat is formed from a different LSR composition and exhibits a weight that is between about 3 g/m² to about 50 g/m²;
   wherein the composite sheet has a thermal resistance value of six seconds or more at 725° C. with the thermal resistance imparted by the silicone topcoat being greater than the thermal resistance imparted by an equal amount by weight of the silicone elastomer layer; and wherein the Young's modulus of elasticity of the silicone topcoat of the thermal barrier layer is greater than that of the silicone elastomer layer of the thermal barrier layer.

2. The composite sheet of claim 1, wherein the first fabric layer comprises a fabric material and one or more silicone treatments located on the top side or bottom side, optionally wherein the silicone treatment of the first fabric layer is located on the top side or bottom side of the first fabric layer that is either adjacent to the thermal barrier layer or opposite the side that is adjacent to the thermal barrier layer.

3. The composite sheet of claim 1, further comprising a second fabric layer having a top side and bottom side;
the second fabric layer being located either adjacent to the thermal barrier layer or on the side of the first fabric layer that is opposite to the thermal barrier layer; and
the second fabric layer including a fabric material and optionally one or more silicone treatments located on the top side or bottom side.

4. The composite sheet of claim 1, having a thermal resistance value of 12 seconds or more at 725° C., alternatively 30 seconds or more at 725° C.

5. The composite sheet of claim 1, wherein the first fabric layer comprises a fabric material and the fabric material of the first fabric layer is a woven fabric, a nonwoven fabric, or a polymeric film or composite selected from polypropylene, polyethylene, fiberglass, polyamides, poly(ethylene) terephthalate, and compositions or mixtures thereof.

6. The composite sheet of claim 5, wherein the first fabric layer is:
i) a woven fabric having threads with a thickness that is equal to or greater than 20 dtex; or
ii) a nonwoven fabric or a polymeric film having a basis weight between about 40 g/m² and about 400 g/m².

7. The composite sheet of claim 1, wherein
the silicone elastomer layer exhibits a weight that is between about 150 g/m² to about 500 g/m².

8. The composite sheet of claim 1, wherein the hardness of the silicone topcoat of the thermal barrier layer is greater than that of the silicone elastomer layer of the thermal barrier layer.

9. The composite sheet of claim 3, wherein the thermal barrier layer comprises at least two topcoats, with a first topcoat being located adjacent the silicone elastomer and a second topcoat separated from the first topcoat and silicone elastomer by the second fabric layer.

10. The composite sheet of claim 1, wherein the LSR composition of the silicone topcoat comprises:
an organopolysiloxane having one or more silicon atom-bonded alkenyl groups on average in one molecule;
an organohydrogenpolysiloxane;
a hydrosilylation reaction catalyst present in any amount capable of curing the coating composition; and
optionally a filler material.

11. The composite sheet of claim 1, wherein the silicone topcoat exhibits a weight between about 5 g/m² to about 30 g/m².

12. The composite sheet of claim 1, wherein the Young's modulus of elasticity of the silicone topcoat of the thermal barrier layer is at least 10% greater, alternatively is at least 20% greater, than that of the silicone elastomer layer of the thermal barrier layer.

13. The composite sheet of claim 12, wherein the Young's modulus of elasticity of the silicone topcoat of the thermal barrier layer is greater than about 2 MPa, alternatively is greater than about 5 MPa.

14. The composite sheet of claim 8, wherein the hardness of the silicone topcoat of the thermal barrier layer is greater than about 35 durometer (Shore A), alternatively is greater than about 40 durometer (Shore A).

15. The composite sheet of claim 7, wherein the silicone topcoat exhibits a weight between about 5 g/m² to about 30 g/m².

16. An inflatable vehicle safety device comprising:
an inflator capable of providing an inflation fluid;
a fluid compartment inflatable by the inflator; and
(i) an inflator wrap located adjacent to the inflator; and/or
(ii) a heat shield located within the fluid compartment;
wherein at least one of the inflator wrap and heat shield comprises a thermally resistant layered composite sheet; and
wherein the thermally resistant layered composite sheet is according to claim 1.

17. The inflatable vehicle safety device of claim 16, wherein the inflator wrap is present and comprises the thermally resistant layered composite sheet.

18. The inflatable vehicle safety device of claim 16, wherein the heat shield is present and comprises the thermally resistant layered composite sheet.

19. The inflatable vehicle safety device of claim 16, wherein the fluid compartment is selected from a front air bag, a side air bag, an air curtain, an H-sock, a Y-sock, a knee bag, and a belt bag.

* * * * *